US012479115B1

(12) United States Patent
Perez

(10) Patent No.: US 12,479,115 B1
(45) Date of Patent: Nov. 25, 2025

(54) FIXED BLADE FOLDING KNIFE ASSEMBLY

(71) Applicant: Michael Gregory Perez, Miami Springs, FL (US)

(72) Inventor: Michael Gregory Perez, Miami Springs, FL (US)

( * ) Notice: Subject to any disclaimer, the term of this patent is extended or adjusted under 35 U.S.C. 154(b) by 130 days.

(21) Appl. No.: 18/615,884

(22) Filed: Mar. 25, 2024

Related U.S. Application Data

(60) Provisional application No. 63/536,497, filed on Sep. 5, 2023, provisional application No. 63/454,645, filed on Mar. 25, 2023.

(51) Int. Cl.
*B26B 1/04* (2006.01)

(52) U.S. Cl.
CPC .................................... *B26B 1/042* (2013.01)

(58) Field of Classification Search
CPC .............. B26B 1/042; B26B 1/02; B26B 1/04
See application file for complete search history.

(56) References Cited

U.S. PATENT DOCUMENTS

| | | | |
|---|---|---|---|
| 633,854 | A | 9/1899 | Kuhn |
| 847,206 | A | 3/1907 | Saunderson |
| 1,056,081 | A | 3/1913 | Yerzley |
| 1,647,405 | A | 11/1927 | Giesen |
| 2,304,601 | A | 12/1942 | Schrade |
| 3,868,774 | A | 3/1975 | Miori |
| 3,942,249 | A | 3/1976 | Poehlmann |
| 4,099,327 | A | 7/1978 | Pesa |
| 4,120,088 | A | 10/1978 | Phelps |
| 4,240,201 | A | 12/1980 | Sawby et al. |
| 4,404,748 | A | 9/1983 | Wiethoff |
| 4,439,922 | A | 4/1984 | Sassano |
| 4,535,539 | A | 8/1985 | Friedman et al. |
| 4,541,175 | A | 9/1985 | Boyd et al. |
| 4,604,803 | A | 8/1986 | Sawby |
| 4,670,984 | A | 6/1987 | Rickard |
| 4,719,700 | A | 1/1988 | Taylor, Jr. |
| 4,750,267 | A | 6/1988 | Boyd |
| 4,893,409 | A | 1/1990 | Poehlmann |
| 4,947,551 | A | 8/1990 | Deisch |
| 5,025,557 | A | 6/1991 | Perreault |
| 5,131,149 | A | 7/1992 | Thompson et al. |
| 5,293,690 | A | 3/1994 | Cassady |
| 5,331,741 | A | 7/1994 | Taylor, Jr. |
| RE34,979 | E | 6/1995 | Gringer |
| 5,425,175 | A | 6/1995 | Rogers |

(Continued)

*Primary Examiner* — Phong H Nguyen
(74) *Attorney, Agent, or Firm* — MALLOY & MALLOY PL

(57) ABSTRACT

A folding knife assembly includes a handle assembly and a blade member having a primary blade portion with a sharpened cutting edge and a rear portion defining a blade tang. The handle assembly includes a central steel member having a forward tang geometry that is structured and disposed for cooperative, keyed engagement with the opposing blade tang within the handle assembly to effectively achieve a blade tang that extends substantially the length of the handle. A lock pin is movable between a locked position and a release position in relation to a pivot pin to allow pivotal movement of the blade member between the open and closed positions and, together with blade and handle tang geometry, creates a fixed blade to handle structure in the open locked position.

7 Claims, 15 Drawing Sheets

(56) References Cited

U.S. PATENT DOCUMENTS

| | | | |
|---|---|---|---|
| 5,495,674 | A | 3/1996 | Taylor, Jr. |
| 5,615,484 | A | 4/1997 | Pittman |
| 5,661,908 | A | 9/1997 | Chen |
| 5,722,168 | A | 3/1998 | Huang |
| 5,794,346 | A | 8/1998 | Seber et al. |
| 5,953,821 | A | 9/1999 | Mearns |
| 5,966,816 | A | 10/1999 | Roberson |
| 5,979,065 | A | 11/1999 | Hsu |
| 6,101,723 | A | 8/2000 | Ford |
| 6,158,127 | A | 12/2000 | Taylor |
| 6,212,779 | B1 | 4/2001 | Mitchell |
| 6,276,063 | B1 | 8/2001 | Chen |
| 6,305,085 | B1 | 10/2001 | Stallegger et al. |
| 6,360,443 | B1 | 3/2002 | Remus |
| 6,430,816 | B2 | 8/2002 | Neveux |
| 6,446,341 | B1 | 9/2002 | Wang et al. |
| 6,668,460 | B2 | 12/2003 | Feng |
| 6,675,484 | B2 | 1/2004 | McHenry et al. |
| 6,751,868 | B2 | 6/2004 | Glesser |
| 6,836,967 | B1 | 1/2005 | Sakai |
| 6,941,661 | B2 | 9/2005 | Frazer |
| 7,032,315 | B1 | 4/2006 | Busse |
| 7,124,510 | B2 | 10/2006 | Frazer |
| 7,152,327 | B2 | 12/2006 | Rudisill et al. |
| 7,181,849 | B2 | 2/2007 | Menter |
| 7,231,718 | B2 | 6/2007 | Outen |
| 7,246,441 | B1 | 7/2007 | Collins |
| 7,249,417 | B2 | 7/2007 | Chu |
| 7,325,312 | B1 | 2/2008 | Janich |
| 7,513,045 | B2 | 4/2009 | Kain |
| 7,555,839 | B2 | 7/2009 | Koelewyn |
| 7,578,064 | B2 | 8/2009 | Busse |
| 7,581,321 | B2 | 9/2009 | Kain |
| 7,627,951 | B2 | 12/2009 | Glesser |
| RE41,259 | E | 4/2010 | McHenry et al. |
| 7,752,759 | B2 | 7/2010 | Perreault |
| 7,774,940 | B2 | 8/2010 | Frank |
| 7,854,067 | B2 | 12/2010 | Lake |
| 7,979,990 | B2 | 7/2011 | Hawk et al. |
| 8,261,633 | B2 | 9/2012 | Maxey |
| 8,356,415 | B2 | 1/2013 | Lin |
| 8,375,589 | B2 | 2/2013 | Bremer et al. |
| 8,468,701 | B1 | 6/2013 | Perez |
| 8,490,288 | B1 | 7/2013 | Mollick et al. |
| 8,499,461 | B1 | 8/2013 | Mollick et al. |
| 8,584,367 | B2 | 11/2013 | Chu et al. |
| 8,646,184 | B2 | 2/2014 | Westerfield |
| 8,707,564 | B2 | 4/2014 | Burch et al. |
| 8,745,878 | B2 | 6/2014 | Glesser |
| 8,752,298 | B2 * | 6/2014 | Collins .................. B26B 1/044 30/160 |
| 8,959,779 | B2 | 2/2015 | Wen |
| 8,978,253 | B2 | 3/2015 | Snyder |
| 8,978,257 | B2 | 3/2015 | Snyder |
| 9,630,328 | B2 | 4/2017 | Koenig et al. |
| 9,878,455 | B1 | 1/2018 | Perez |
| 10,131,059 | B2 | 11/2018 | Ikoma |
| 10,688,672 | B1 | 6/2020 | Perez |
| 2004/0031155 | A1 | 2/2004 | Hitchcock et al. |
| 2004/0158991 | A1 | 8/2004 | Freeman |
| 2005/0097755 | A1 | 5/2005 | Galyean et al. |
| 2005/0262701 | A1 | 12/2005 | Lai |
| 2006/0026844 | A1 | 2/2006 | Ping |
| 2006/0168817 | A1 | 8/2006 | Kao |
| 2006/0272157 | A1 | 12/2006 | Zeng |
| 2007/0256310 | A1 | 11/2007 | Pool et al. |
| 2009/0193664 | A1 | 8/2009 | Galyean |
| 2009/0260234 | A1 | 10/2009 | Lai |
| 2009/0277015 | A1 | 11/2009 | Duey |
| 2010/0192381 | A1 | 8/2010 | Sakai |
| 2011/0010947 | A1 | 1/2011 | Freeman |
| 2011/0067246 | A1 | 3/2011 | Perez |
| 2012/0023753 | A1 | 2/2012 | Wen |
| 2012/0324738 | A1 | 12/2012 | Chu et al. |
| 2013/0160300 | A1 | 6/2013 | Liu |
| 2013/0283621 | A1 | 10/2013 | Snyder et al. |
| 2014/0047718 | A1 | 2/2014 | Fellows et al. |
| 2014/0115898 | A1 | 5/2014 | Collins et al. |
| 2014/0115900 | A1 | 5/2014 | Ikoma |
| 2014/0259687 | A1 | 9/2014 | Griffey |
| 2015/0239134 | A1 | 8/2015 | Duey |
| 2015/0343650 | A1 | 12/2015 | Valdez |
| 2017/0120461 | A1 | 5/2017 | Tom et al. |
| 2017/0144316 | A1 | 5/2017 | Trull |
| 2017/0165849 | A1 | 6/2017 | DeBaker |
| 2017/0167172 | A1 | 6/2017 | Jelbert et al. |

* cited by examiner

FIXED BLADE FOLDING KNIFE ASSEMBLY

BACKGROUND OF THE INVENTION

This non-provisional patent application is based on provisional patent application Ser. No. 63/536,497 filed on Sep. 5, 2023 and provisional patent application Ser. No. 63/454,645 filed on Mar. 25, 2023.

FIELD OF THE INVENTION

The present invention is directed to a folding knife assembly having a blade member and a handle assembly with a central steel member, which together with a pivot pin and lock pin arrangement create a fixed blade to handle structure when the blade is in an open and locked position.

DESCRIPTION OF THE RELATED ART

Folding knives have been developed over the years to make it safer for a user to carry a knife on his or her person, yet remain readily available to be deployed when needed. Typically, folding knives consist of a movable blade that is fixed to some type of pivot point within a handle, the handle being structured to shield the sharpened edge of the knife blade when it is in a closed position for transport and/or storage. An important variation on the standard folding knife is a folding knife with a lock or stop such that a user must actuate some type of release mechanism in order to free the blade so that it may be moved from an opened position to a closed position.

Folding knife assemblies employing substantially standard size knife blades made of hardened steel are structured for heavy-duty applications and are often used by persons in the construction industry, outdoor sportsman activities, bushcraft, and other such rigorous activities where a heavy-duty knife assembly is required. Typically, the user of a larger folding knife assembly will utilize a sheath or other holder in order to comfortably and safely carry the knife on his or her person, such as attached to a belt loop, tool belt or other such article. There are also smaller or more intermediate sized folding knife assemblies commonly referred to as pocket knives. Pocket knives typically include a single movable blade which is attached to the handle via a pivot member which allows the blade to be opened and closed. Moreover, many pocket knives employ some form of lock or stop in order to avoid possible injury to a user as a result of inadvertent closure of the blade while the knife is in use.

A significant problem common to all of the folding knives noted above is a utilization of a single blade member which is only secured at one end by a pivot structure, which also serves to attach the blade member to the handle. More particularly, upon opening the single blade from a closed position to an open position about its pivot point, only a small portion of the single blade member is retained within and supported by the handle of the knife. As a result, a substantial weak point exists in currently known folding knives when the blade is deployed in an open configuration (i.e., the weak point being the interface of the single blade member and the handle). In contrast, a traditional fixed handle and blade knife of similar dimensions will include a significant portion of a single blade member (i.e., the tang or shank) being secured between opposing handle members (i.e., handle slabs). Thus, a fixed handle and blade knife assembly provides significantly greater strength and stability to the overall knife blade versus a commonly known folding knife assembly of similar dimension.

In particular, currently known folding knives in general do not have sufficient strength when a particular job or task requires the use of the blade for applying a prying force. More particularly, currently known folding knives are not designed for side loads, prying, etc. Typically, a fixed blade knife is required for any bushcraft or outdoor tasks involving heavy cutting or chopping. The fixed blade folding knife of the present invention is specifically structured to eliminate all of the weaknesses of currently known folding knife structures and designs, and creates a folding knife with similar strength characteristics to a conventional one-piece fixed blade knife. The specific structure of the fixed blade folding knife of the present invention allows the user to compactly carry a large camp or bushcraft knife folded and stored in a glove box, backpack or carried on a belt in a sheath or other holder.

SUMMARY OF THE INVENTION

The present invention is directed to a fixed blade folding knife assembly that includes a handle assembly and a blade member having a primary blade portion with a sharpened cutting edge and a rear portion defining a blade tang. The handle assembly includes a central steel member having a forward tang geometry that is structured and disposed for cooperative, keyed engagement with the opposing blade tang within the handle assembly to effectively achieve a blade tang that extends substantially the length of the handle. A pivot pin extends through the handle assembly and is held by a nut on one side of the handle assembly. The pivot pin extends through the blade member to allow pivotal movement of the blade member relative to the handle assembly between a closed, stowed position and an open, operable position. A lock pin is movable within a channel extending through the blade member from the top to the bottom of the blade member just forward of the blade tang. A spring pin assembly including a spring pin and threaded plug applies pressure to a locking detent located on the side of the lock pin to maintain the lock pin engagement within a channel of the pivot pin. This creates a tight block to any movement of the blade member so that the blade is secure in the locked position. The lock pin is flush with the top of the bolster area of the blade member when in the locked and open position. To fold the blade member to the closed position, the lock pin is pressed in a bottom access cavity until the bottom of the lock pin is flush with the bottom cavity. This upward movement of the lock pin allows the spring pin to move from the locking detent to a transition detent in the lock pin. In this position of the lock pin, the blade member is now movable relative to the handle assembly so that the blade member can fold up adjacent to the handle slab on one side of the handle assembly. Once fully closed with the knife blade edge covered within a raised overhang contour of the handle slab, the lock pin is again pressed downwardly so that the top of the lock pin is flush with the top bolster area of the blade member. This secures and locks the blade member in the closed position. It is important to note that the design and structure of the blade member and the handle assembly, and particularly the central steel member of the handle assembly, can be configured to allow folding and closing of the blade member on either the left side of the handle blade, adjacent the left handle slab, or on the right side of the handle assembly, adjacent the right handle slab, to accommodate both left handed and right handed users.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
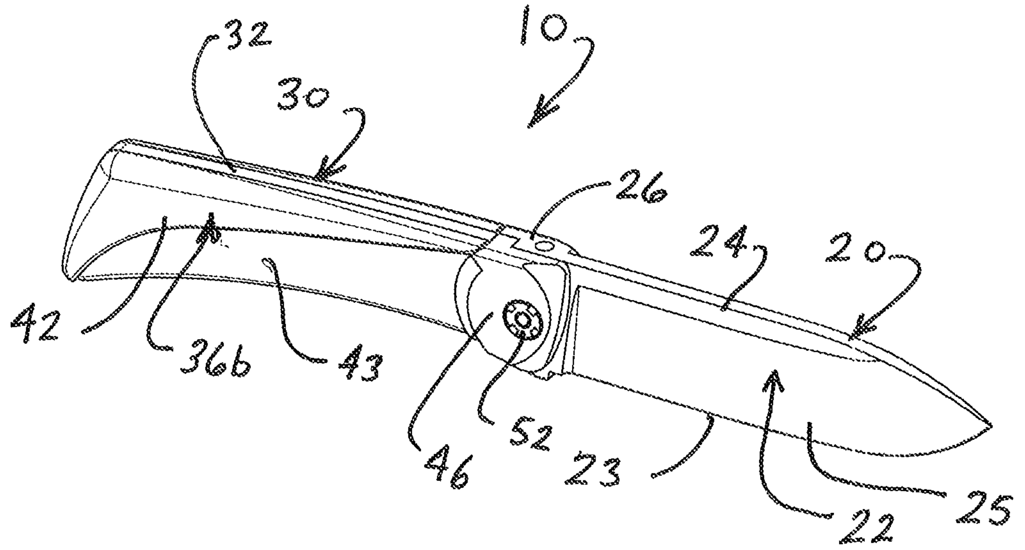
FIG. 1 is a side perspective view of the fixed blade folding knife assembly in accordance with the present invention and shown with the blade member disposed in an open, locked and fixed position relative to a handle assembly.

Referring to the several views of the drawings, and initially FIG. 1, the fixed blade folding knife assembly is shown and is generally indicated as 10. As seen in FIG. 1, the fixed blade folding knife assembly 10 includes a blade member 20 including a primary blade portion 22 having a sharpened cutting edge 23, a grind 25 on opposite side faces of the primary blade portion and a spine 24 on the top of the blade member. The opposite end of the blade member 20 has a bolster portion 26 and a blade tang 28.

Figure 2:
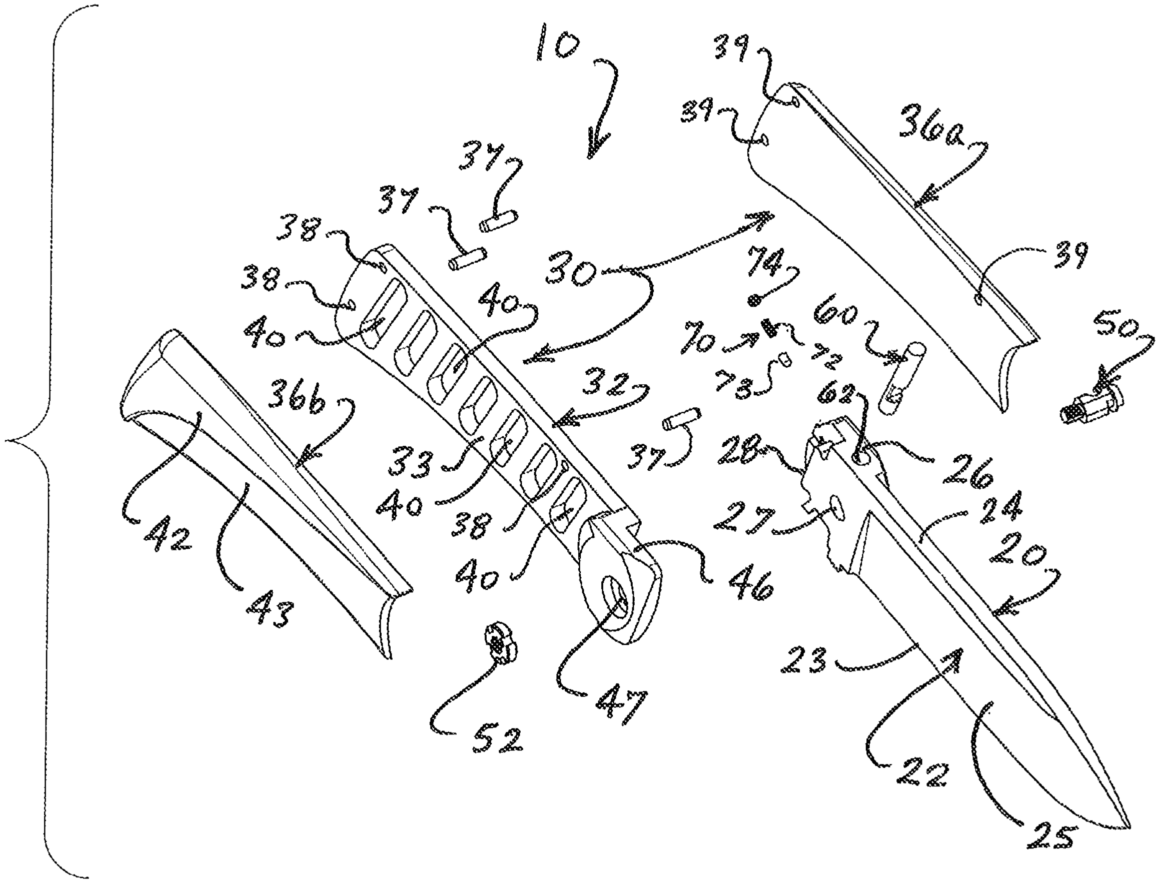
FIG. 2 is an exploded right side perspective view of the fixed blade folding knife assembly of the present invention showing the primary component part thereof.
Figure 3:
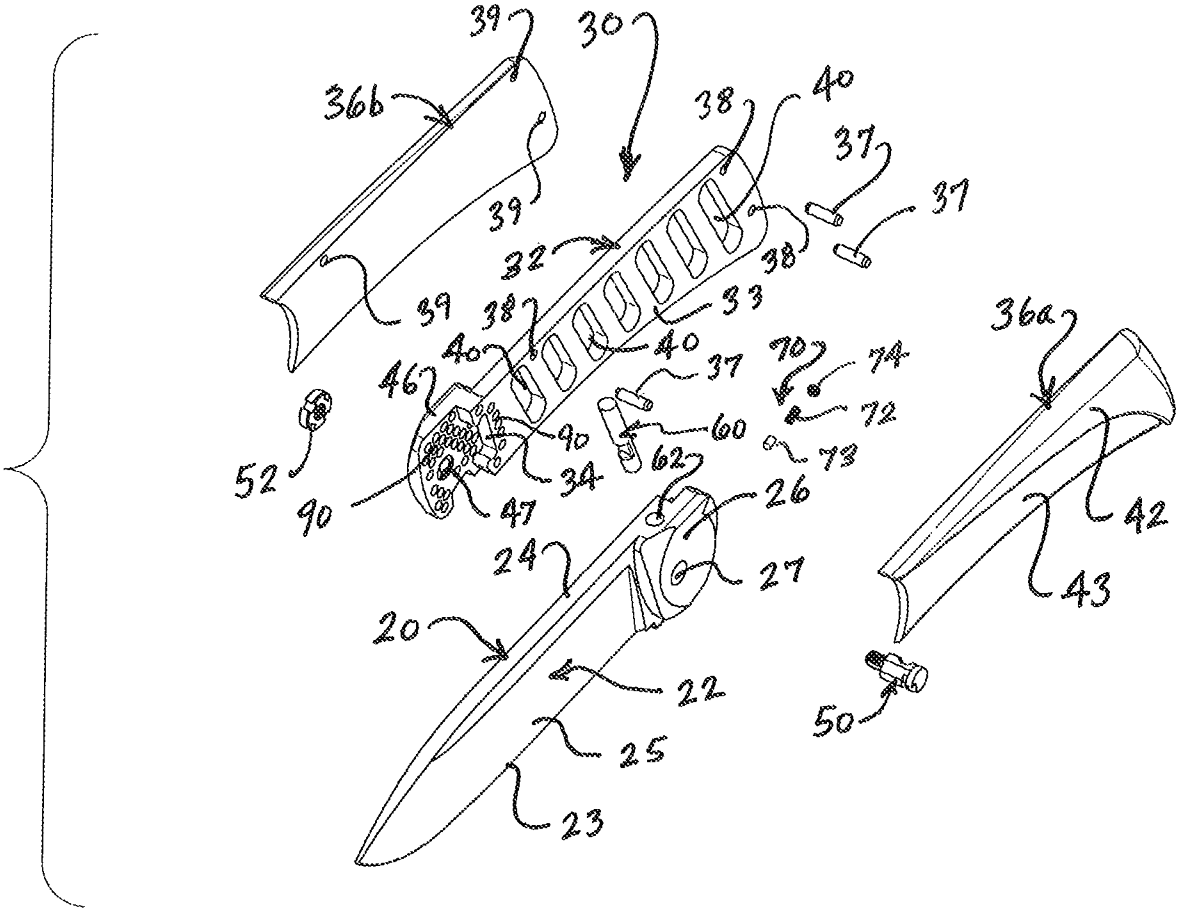
FIG. 3 is an exploded left side perspective view of the fixed blade folding knife assembly of the present invention showing the primary component part thereof.
Figure 4:
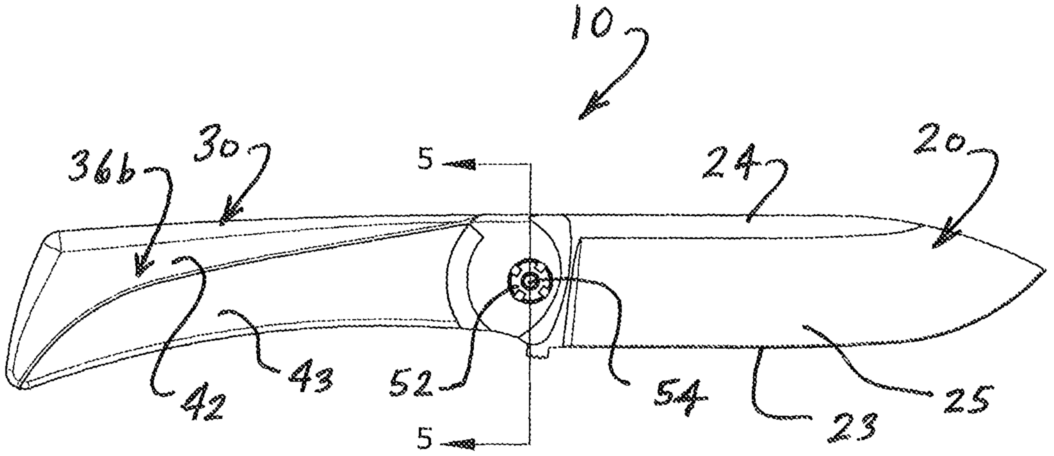
FIG. 4 is a right side elevational view of the fixed blade folding knife assembly of the present invention shown with the blade member disposed in an open and locked position.
Figure 5:
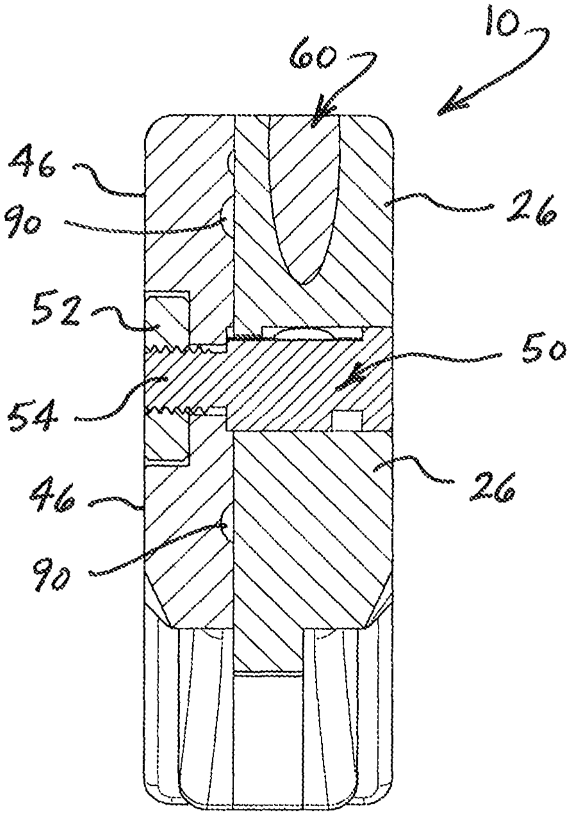
FIG. 5 is a cross-sectional view taken along the plane of the line indicated by arrows 5-5 in FIG. 4.
Figure 6:
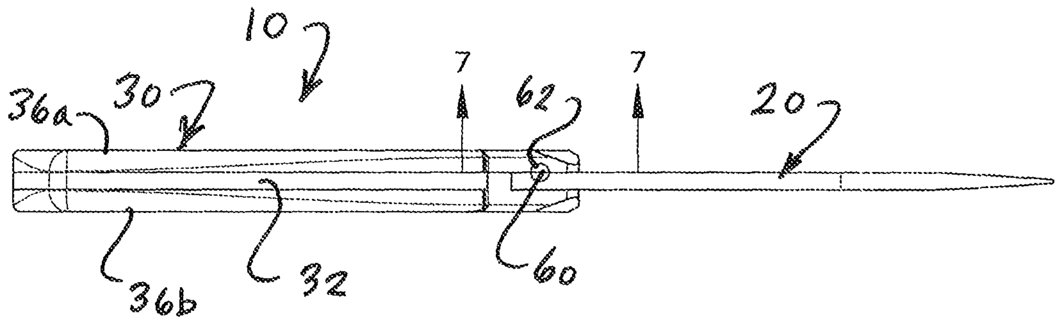
FIG. 6 is a top plan view of the fixed blade folding knife assembly of the present invention with the blade member disposed in the open and locked position.

The fixed blade folding knife assembly 10 further includes a handle assembly 30. As seen in FIGS. 2 and 3, the handle assembly 30 has a monolithic central steel member 32 with a main body 33 and a handle tang portion 34 having a geometry that is cooperatively structured and configured for mating engagement with the shape of the blade tang 28. The complementary geometry between the blade tang 28 and the handle tang portion 34 effectively provides for an extended tang (including the main body 33 of the central steel member 32) that extends substantially through the length of the handle assembly 30 to greater strength and structural integrity to the blade member 20 when the blade member 20 is in the extended and locked position, as seen in FIGS. 1, 4 and 6. The extended tang through the handle assembly that is integrated as part of the blade member 20 essentially provides the equivalent strength and structural integrity as a conventional fixed blade knife.

Figure 16:
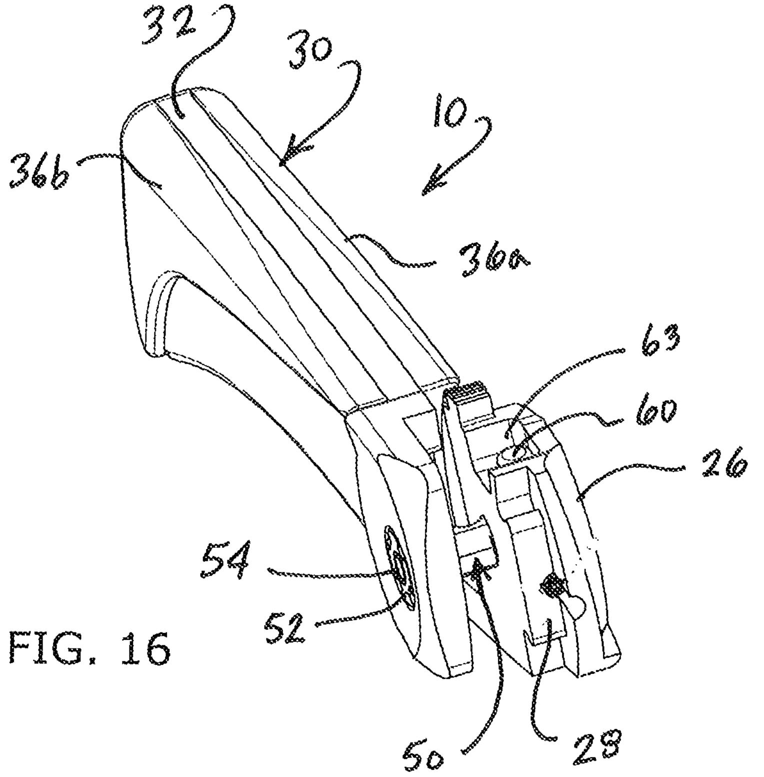
FIG. 16 is a front, right side top perspective view showing the fixed blade folding knife assembly of the present invention with the blade member in the closed position and with the sharpened edge of the blade member concealed within the handle assembly.
Figure 17:
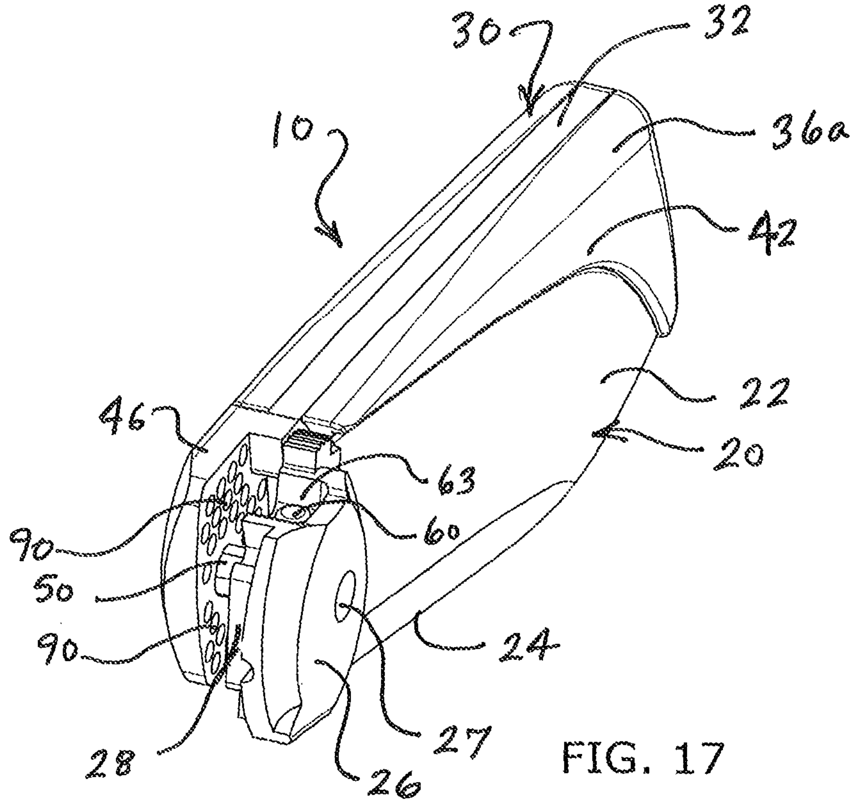
FIG. 17 is a front left, top perspective view showing the fixed blade folding knife assembly of the present invention with the blade member in the closed position and with the sharpened edge of the blade member concealed within the handle assembly.

Referring to FIGS. 2 and 3, the handle assembly 30 further includes opposite left and right handle slabs **36*a*, 36*b* that are affixed to the opposite sides of the main body 33 of the monolithic central steel member 32. More particularly, dowel pins 37 extend through apertures 38 in the monolithic central steel member 32 and are received within recesses 39 in the inside faces of the left and right handle slabs 36***a*, 36*b*. The dowel pins 37 are used for alignment purposes to ensure that the left and right handle slabs 36*a*, 36*b* are perfectly aligned and fitted to the central steel member 32. In a preferred embodiment, the left and right handle slabs 36*a*, 36*b* are glued to the opposite sides of the central steel member 32 to provide a secure bond. The openings 40 in the monolithic central steel member 32 allow for the adhesive to pass therethrough so that the opposite handle slabs 36*a*, 36*b* are not only adhered to the central steel member but are effectively adhered to one another. The left and right handle slabs 36*a*, 36*b* each include an overhang portion 42 and a negative blade grind contour 43 below the overhang portion 42 and extending up and behind the overhang portion 42. The negative blade grind contour 43 on the handle slabs matches the geometry of the blade grind 25 on the primary blade portion 22 so that when the blade member 20 is folded and closed within the handle assembly 30, the matching tapered geometry of the blade grind 25 with the negative blade grind contour 43 on the handle slab allows for minimal thickness of the overall handle assembly 30 with the blade member 20 folded and closed. The overhang portion 42 on the handle slabs 36*a*, 36*b* protectively conceals the sharpened blade edge 23 when the blade member 20 is folded in the closed position, as seen in FIGS. 16 and 17. In the embodiments shown throughout the several views of the drawings, the blade member 20 and the handle assembly 30 are structured to allow for the blade member 20 to fold up on the left side of the handle assembly 30 with the sharpened blade edge 23 being received under the overhang portion 42 of the left handle slab 36*a*. It should be noted that the fixed blade folding knife assembly 10 can be manufactured to allow for the blade member 20 to fold to the closed position on the right side of the handle assembly 30, with the sharpened blade edge 23 received under the overhang portion 42 of the right handle slab 36*b*.

Figure 18:
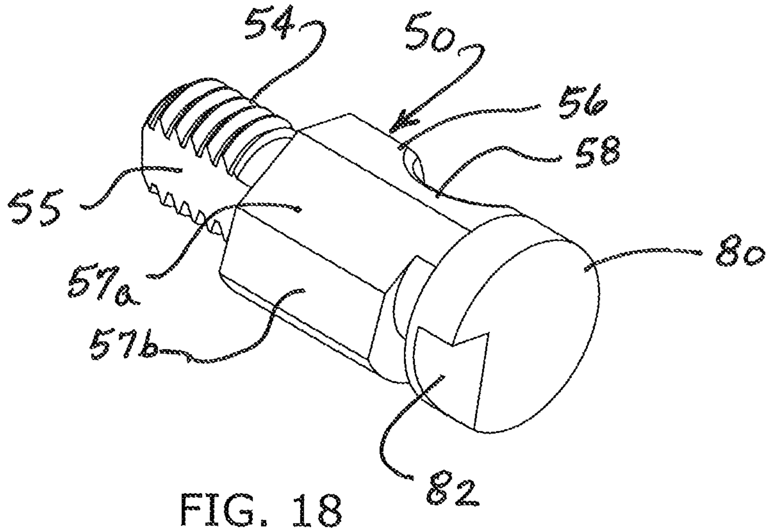
FIG. 18 is a perspective view of the pivot pin.

The monolithic central steel member 32 further includes a forward bolster portion 46 that is manufactured as one piece with the remainder of the central steel member 32. In the embodiment shown throughout the several views of the drawings, the bolster portion 46 on the central steel member 32 is a right bolster portion that corresponds with the left bolster portion 26 of the blade member 20. A pivot pin 50 is fitted through an aperture 27 in the left bolster portion 26 of the blade member 20 and into an aligned aperture 47 in the right bolster portion 46 of the central steel member 32. A pivot pin nut 52 is threadably fastened to a threaded end 54 of the pivot pin 50 within a captivated recess 48 on the outboard side of the bolster portion 46 of the central steel member 32. As seen in FIG. 18, the threaded end portion 54 of the pivot pin 50 includes a flat area 55 on one side that is specifically dimensioned for cooperating alignment with a flat surface within the aperture 47 in the bolster portion 46 of the central steel member 32. This ensures proper aligned positioning of the pivot pin 50 through both the blade member 20 and the bolster portion of the central steel member 32, while preventing rotation of the pivot pin 50 relative to the handle assembly 30. A main body 56 of the pivot pin 50, as seen in FIG. 18, has flat surfaces 57*a*, 57*b* that are specifically sized and dimensioned for alignment with flat surfaces within the aperture 27 through the blade member 20, further ensuring proper positioning and alignment of the pivot pin 50 through the blade member 20 and into the central steel member 32.

Figure 7:
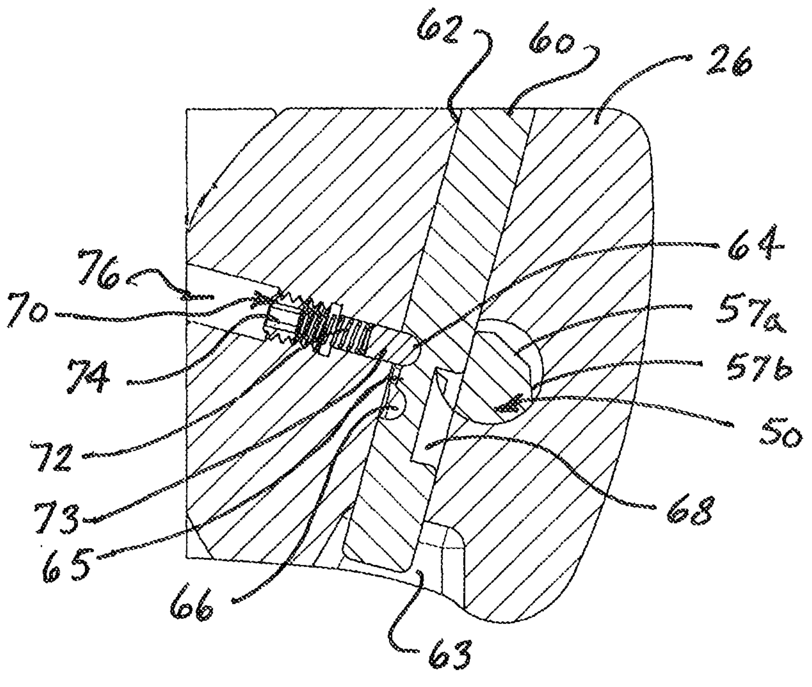
FIG. 7 is a partial cross-sectional view taken along the lines 7-7 of FIG. 6 and showing a lock pin moved to a locked position with a spring pin received within a locking detent of the lock pin to hold the blade member in the open, locked and fixed position relative to the handle assembly.
Figure 8:
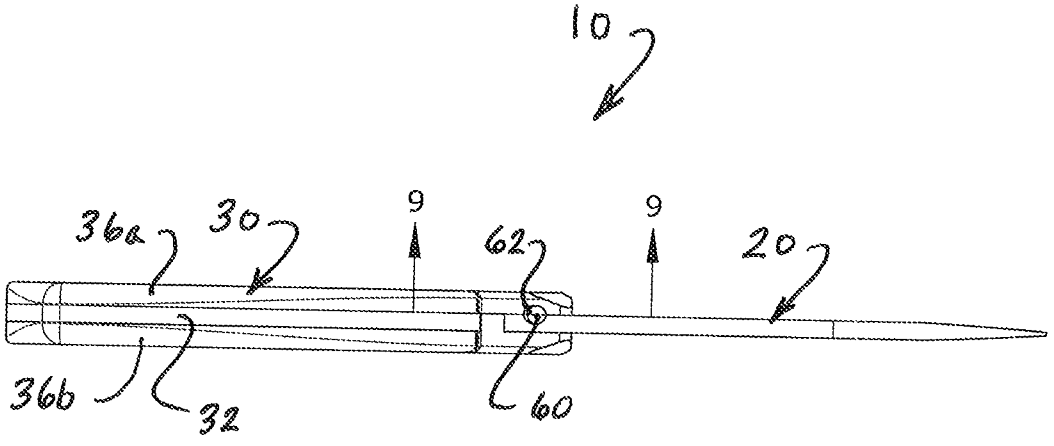
FIG. 8 is a top plan view of the fixed blade folding knife assembly of the present invention with the blade member disposed in the open position.
Figure 9:
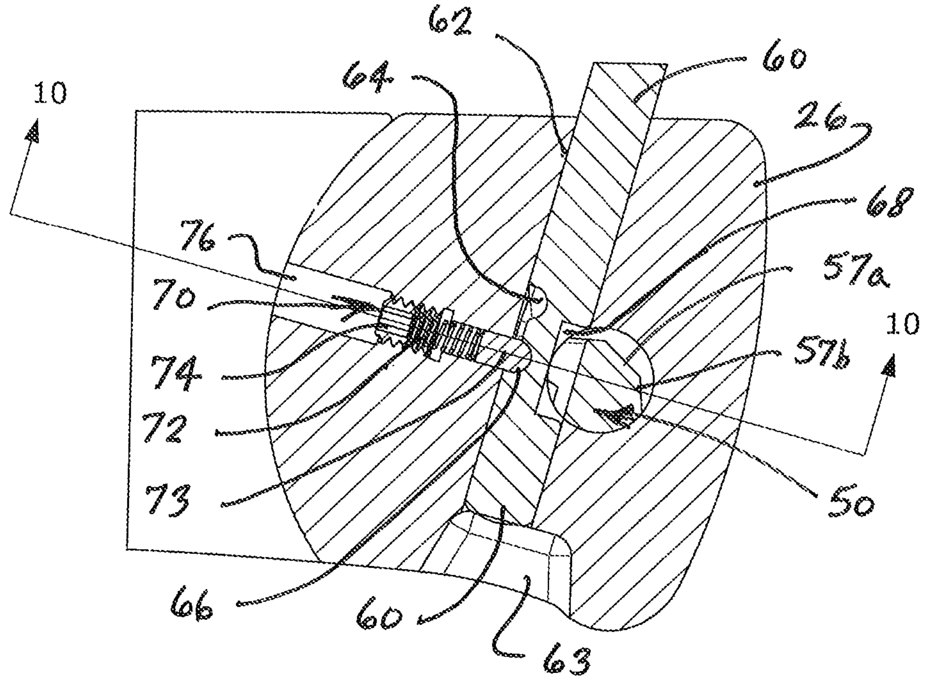
FIG. 9 is a cross-sectional view taken along the line indicated as 9-9 in FIG. 8 and showing the lock pin moved upwardly to a release position with the spring pin received within a release detent in the locking pin and a transition cutout of the lock pin moved in relation to a pivot pin channel in the pivot pin, allowing the pivot pin to rotate and thereby allowing folding movement of the blade member to the closed position.
Figure 10:
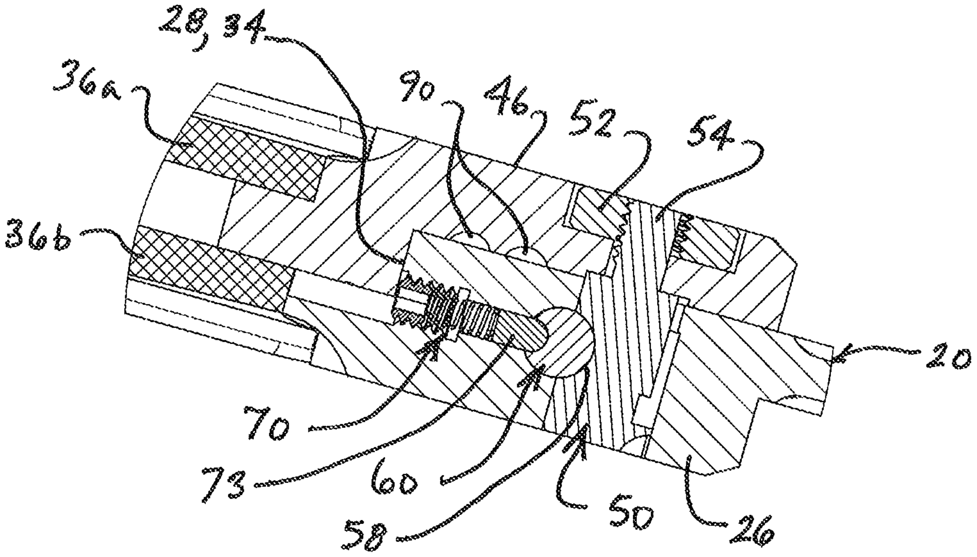
FIG. 10 is an isolated cross-sectional view taken along the lines 10-10 in FIG. 9 and showing a spring pin assembly including a spring pin in relation to the lock pin and pivot pin.
Figure 11:
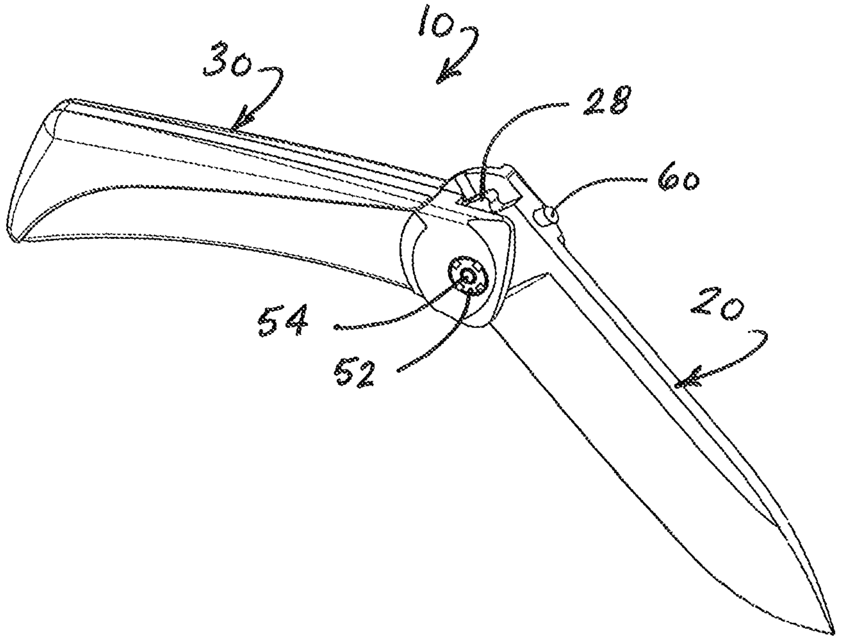
FIG. 11 is a side perspective view showing the fixed blade folding knife assembly of the present invention with the blade member being moved in transition from the open, locked position to the closed position.
Figure 12:
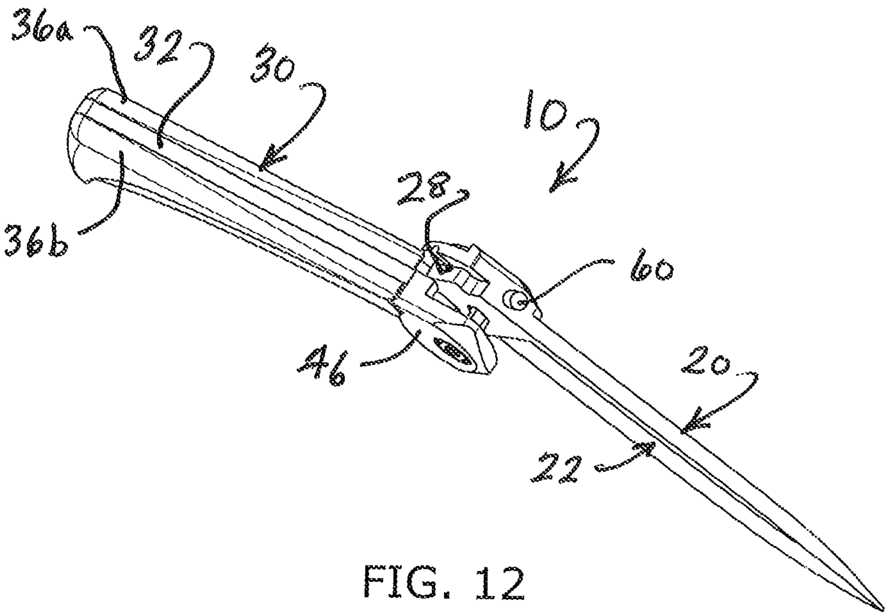
FIG. 12 is a top right perspective view of the fixed blade folding knife assembly of the present invention showing the blade member being moved in transition from the open, locked position to the closed position.
Figure 13:
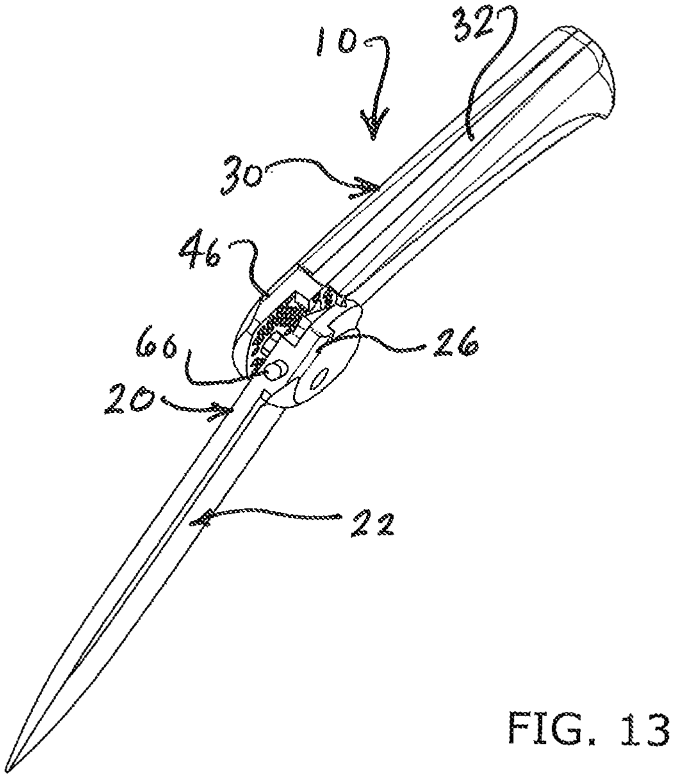
FIG. 13 is a top left perspective view of the fixed blade folding knife assembly of the present invention showing the blade member being moved in transition from the open, locked position to the closed position.
Figure 14:
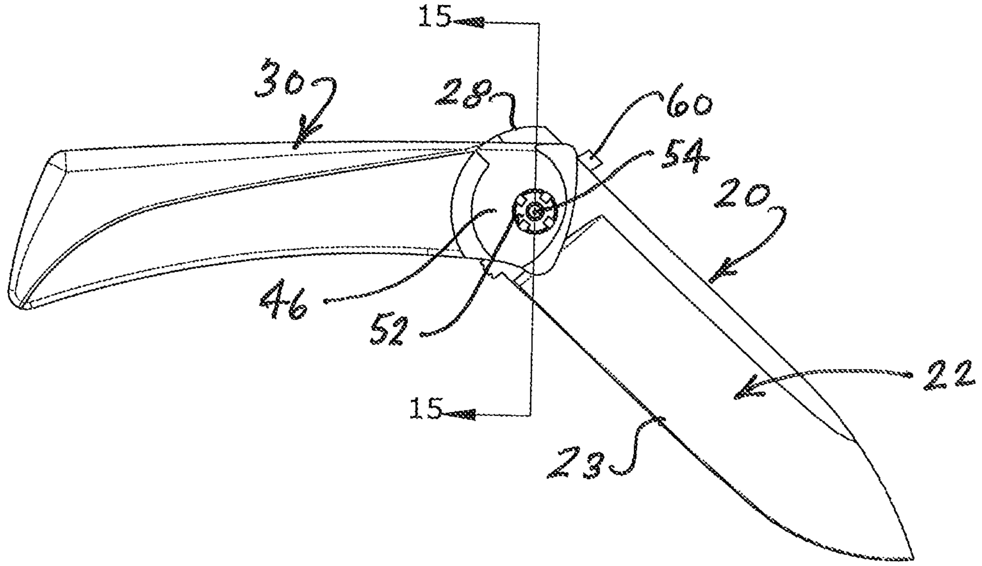
FIG. 14 is a right side elevational view of the fixed blade folding knife assembly of the present invention and showing the blade member being moved in transition from the open, locked position to the closed position.
Figure 15:
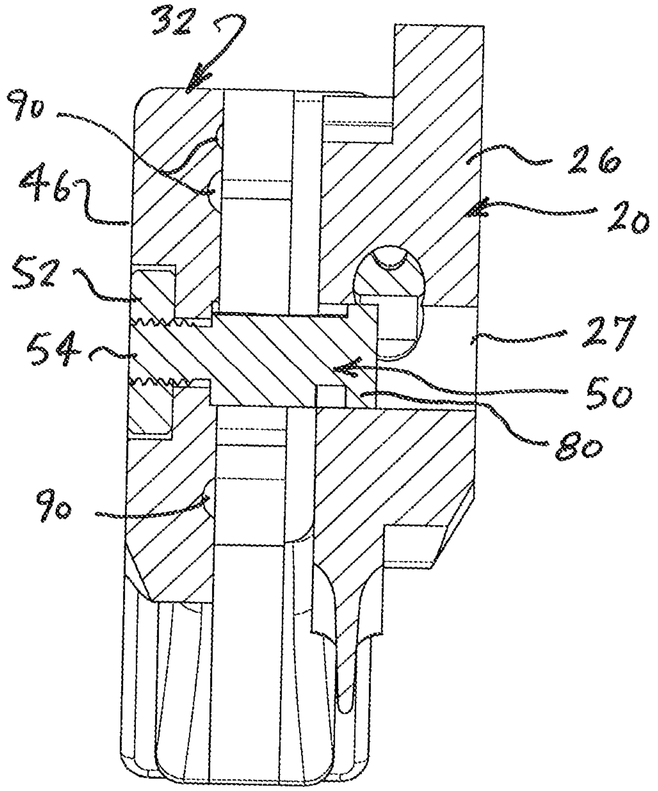
FIG. 15 is a cross-sectional view taken along the lines 15-15 in FIG. 14.
Figure 20:
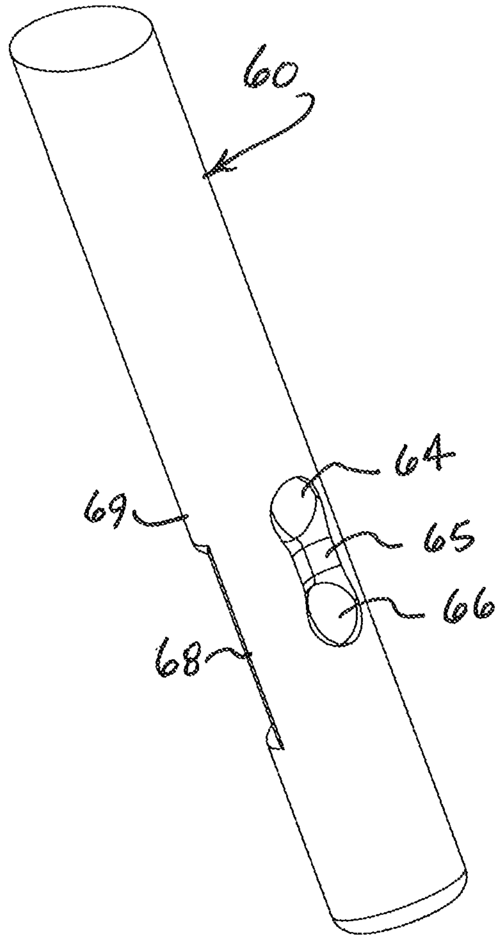
FIG. 20 is a perspective view of the lock pin and revealing a locking detent and a release (transition) detent.

Referring to FIGS. 2-3 and 7, 9-10, the bolster portion 26 of the blade member 20 includes a lock pin channel 62 that extends from the top of the bolster to a bottom of the bolster within a recessed access area 63. A cylindrical lock pin 60 is slidably received within the congruently sized lock pin channel 62 and is movable therein between an unlocked position and a locked position. The blade member 20 further includes a spring pin assembly 70 including a spring pin 72 with a plunger head 73 and a threaded plug 74. The spring pin assembly 70 is received within a channel 76 that is open at the blade tang 28 and extends through the rear portion of the blade member to the lock pin channel 62. The channel 76 for the spring pin assembly 70 is generally perpendicular to the lock pin channel 62, as seen in FIGS. 7 and 9. Referring to FIGS. 7, 9 and 20, the lock pin 60 includes a lock detent 64 and a transition detent 66 spaced from the lock detent 64 on one side of the lock pin 60. A recessed bridge 65 extends between the lock detent 64 and the transition detent 66. The threaded plug 74 of the spring pin assembly 70 is tightened to adjust tension of the spring of the spring pin assembly and pressure of the plunger head 73 of the spring pin 72 on the lock pin 60. More particularly, the plunger head 73 of the spring pin 72 is pressed inwardly to engage with either the locking detent 64 when the lock pin 60 is in a locked position, as seen in FIG. 7, and is further adapted for receipt within the transition detent 66 when the lock pin 60 is in the unlocked position, as seen in FIG. 9. Referring to FIG. 9, the lock pin 60 extends up above the top surface of the bolster 26 of the blade member 20 when in the unlocked position. Upon applying pressure on the top of the lock pin 60 using applied pressure of a finger, a sufficient axial downward force is applied to the lock pin 60 causing the plunger head 73 of the spring pin 72 to be moved across the recessed bridge 65 and into the locking detent 64, as seen in FIG. 7. In this locked position, the top of the lock pin 60 is flush with the top surface of the bolster portion 26 of the blade member 20 and a bottom end of the lock pin 60 protrudes within the recessed access area 63 on the bottom of the blade member bolster portion 26. To move the lock pin 60 to the unlocked position, as seen in FIG. 9, pressure is applied with the finger to the bottom end of the lock pin 60 within the access area 63, again causing the plunger head 73 of the spring pin 72 to travel across the recessed bridge 65 and into the transition detent 66.

Figure 19:
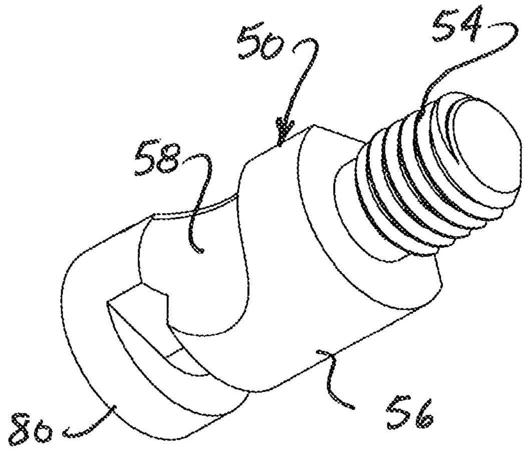
FIG. 19 is a perspective view of the pivot pin and revealing a pivot pin channel in the side of the pivot pin.
Figure 21:
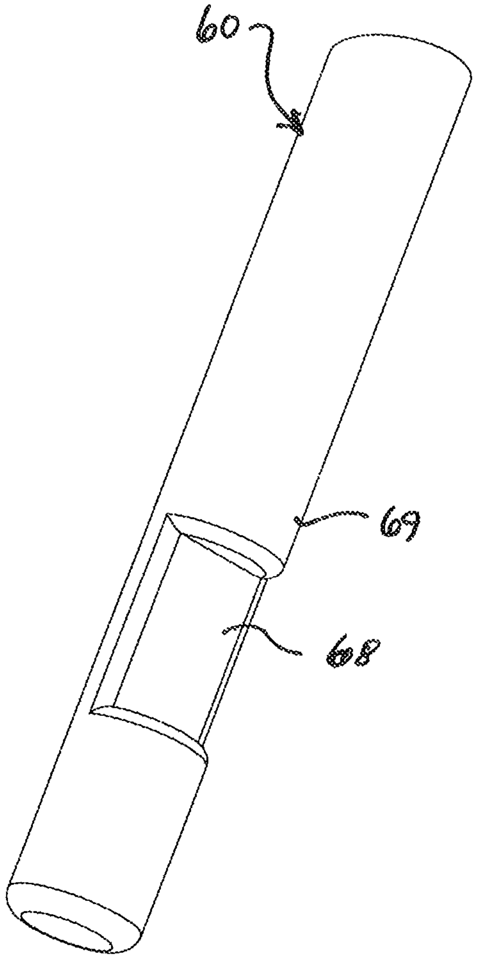
FIG. 21 is an opposite perspective view of the lock pin and revealing a transition cutout in the lock pin.
Figure 22:
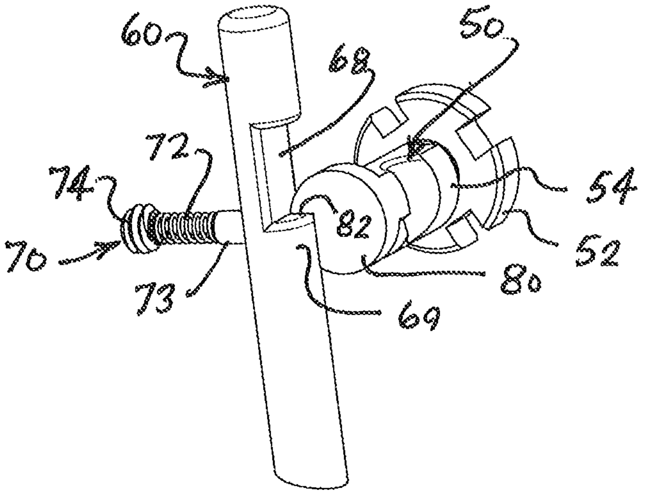
FIG. 22 is an isolated perspective view of the lock pin and pivot pin and showing the lock pin position relative to the pivot pin when the blade member is in the folded and stowed position within the handle assembly, and wherein the shoulder of the cutout area on the lock pin is received within the notched portion of the head of the pivot pin to lock the blade member in the folded, closed position.
Figure 23:
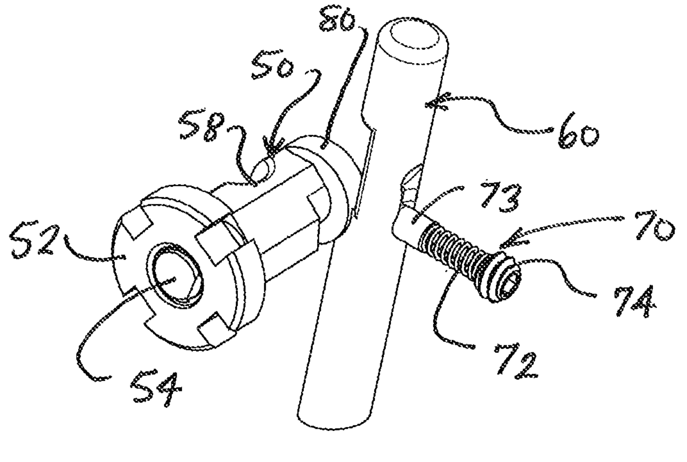
FIG. 23 is an isolated perspective view of the lock pin and the pivot pin showing the shoulder area of the cutout of the lock pin received within the notched area on the pivot pin head and the spring pin plunger engaged within the locking detent of the lock pin to secure the blade member in the folded, closed and locked position within the handle assembly.
Figure 24:
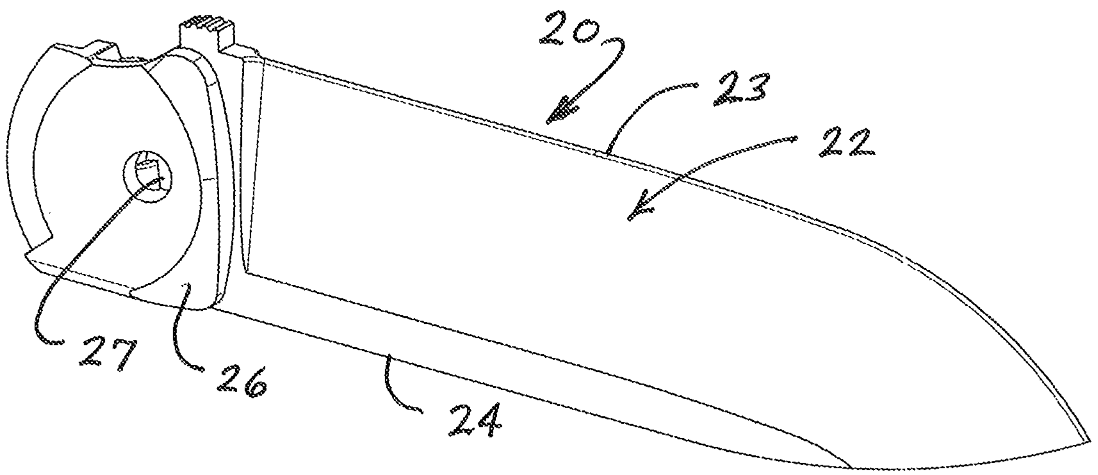
FIG. 24 is an isolated perspective view showing the left side of the blade member with the blade member inverted.
Figure 25:
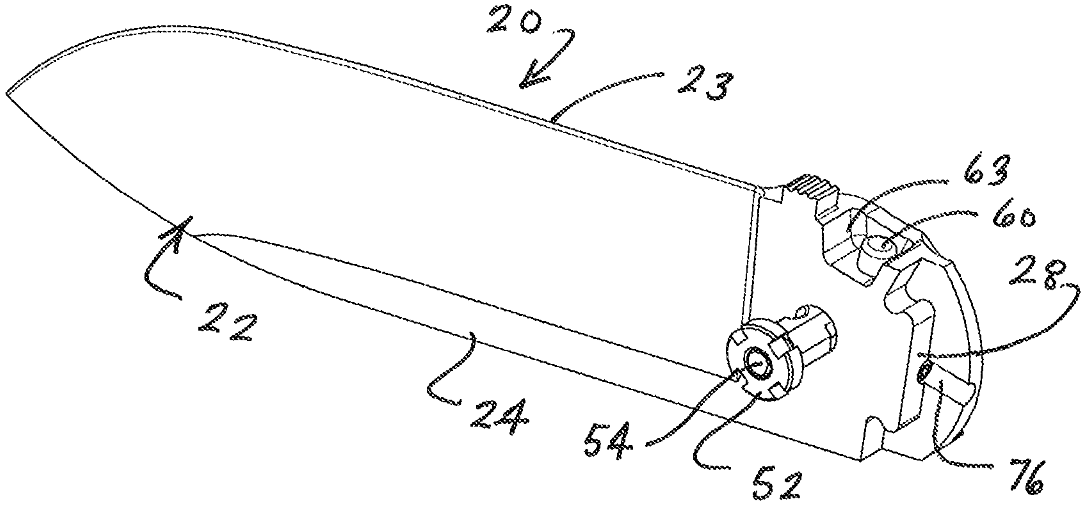
FIG. 25 is a perspective view of the right side of the blade member with the blade member inverted.

Referring to FIGS. 21 and 22, the lock pin 60 further includes a cutout section 68 on the opposite side of the lock pin 60 relative to the locking detent 64 and transition detent 66. The cutout section 68 is specifically sized and positioned on the lock pin 60 to allow for locking and unlocking engagement with the pivot pin 50. More particularly, the pivot pin 50 includes a concave dished area 58, as best seen in FIG. 19. When the lock pin 60 is moved downwardly into the locked position, with the spring pin plunger head 73 received in the locking detent 64, the cylindrical body 69 of the lock pin 60, just above the cutout section 68, is received within the concave dished portion 58 of the pivot pin 50, thus preventing folding rotation of the blade member 20 relative to the pivot pin 50 and handle assembly 30. In the locked position, as seen in FIG. 7, the blade member 20 is extended, as seen in FIG. 6, to the fully open and locked position. To fold the blade member 20 to the closed position within the handle assembly 30, the lock pin 60 is pushed upwardly by applying pressure to the bottom of the lock pin within the access area 63, causing the cutout section 68 in the lock pin to be aligned with the pivot pin 50 so that the lock pin 60 is no longer engaged with the pivot pin 50. This, thereby, allows the blade member 20 to be rotated relative to the pivot pin 50 and handle assembly 30. When moving the blade member 20 from the fully opened and locked position, as seen in FIGS. 1 and 6, to the folded, closed position within the handle assembly 30, as seen in FIGS. 16-17, the lock pin 60 is moved to the unlocked position, as seen in FIG. 9. Thereafter, the entire blade member 20, including the bolster portion 26 is urged axially outboard on the pivot pin 50 and relative to the handle assembly so that the blade member 20 can then be folded closed on one side of the handle assembly 30. In the embodiments shown throughout the several views of the drawings, the blade member 20 is moved outwardly on the left side of the handle assembly and folded closed on the left side of the handle assembly 30 so that the sharpened blade edge 23 is received under the overhang portion 42 of the left handle slab 36*a*. The lock pin 60 can then be moved to the locked position. When moving the lock pin 60 to the locked position with the blade member 20 folded closed, and the blade member being axially moved outward on the pivot pin 50, a shoulder of the junction of the cutout section 68 and cylindrical body 69 on the lock pin 60 moves within a notch 82 in the head 80 of the pivot pin 50, as seen in FIGS. 22-23. This effectively locks the blade member 20 relative to the pivot pin 50 and handle assembly 30 so that the blade member cannot be opened until the lock pin 60 is moved to the unlocked position, whereupon the lock pin 60 disengages from the notch 82 of the pivot pin head 80. Once the blade member 20 is folded open to the fully opened position, pressure is applied to the outboard sides of the bolster areas 26, 46 of the blade member and central steel member, causing the blade member 20 to move axially inward, whereupon the blade tang 28 and handle tang 34 engage one another and the lock pin 60 can then be moved to the locked position to secure the blade member 20 in the fully opened and fixed position, as seen in FIGS. 1, 4 and 6.

Referring to FIGS. 2 and 17, the inner face of the handle bolster portion 46 and handle tang 34 have an arrangement of recessed dimples 90 for collecting debris, such as dirt and fine sand particles during use of the fixed blade folding knife assembly. This helps to minimize friction and prevents fouling or jamming when moving the blade member 20 relative to the handle assembly 30 between the folded and open positions. Naturally, the recessed dimples 90 should be rinsed periodically to remove any accumulated debris, thereby ensuring proper functional operation of the fixed blade folding knife assembly 10.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A fixed blade folding knife assembly comprising:

a blade member including a primary blade portion having a sharpened cutting edge, a blade grind on opposite side faces of the primary blade portion, a spine extending at least partially along the top edge of the blade member, a bolster area to the rear of the primary blade portion and a blade tang at a rear end portion of the blade member opposite of the primary blade portion;

a handle assembly including a central steel member having a main body, a handle tang portion and a forward handle bolster portion;

a pivot pin pivotally connecting the blade member to the handle assembly and including a longitudinal central axis extending between opposite ends of the pivot pin;

the blade member being pivotally movable about the axis of the pivot pin and relative to the handle assembly between an open configuration wherein the blade member extends outwardly from a forward end of the handle assembly, and a closed position wherein the blade member is folded into the handle assembly with at least the sharpened cutting edge of the primary blade portion concealed within the handle assembly;

the blade tang and the handle tang portion being cooperatively configured for complementary engagement with one another when the blade member is in the open position to thereby integrate the central steel member as an extension of the blade tang within the handle assembly to enhance structural integrity of the blade member when in the open position; and a blade locking assembly including a lock pin movably received within a channel in the blade member, and the lock pin being movable into locked and unlocked engagement with the pivot pin.

2. The fixed blade folding knife assembly as recited in claim 1 wherein the pivot pin includes a concave dish shaped area for receiving a cylindrical section of the lock pin therein when the lock pin is in locked engagement with the pivot pin, thereby defining a locked position of the lock pin and preventing pivotal movement of the blade member relative to the handle assembly.

3. The fixed blade folding knife assembly as recited in claim 2 further comprising:

a spring pin assembly fitted within a channel in the blade member and communicating with the channel of the lock pin and the spring pin assembly including a spring pin and a plunger head for forced engagement against the lock pin to hold the lock pin in the locked position and an unlocked position wherein the lock pin is disengaged with the pivot pin, thereby allowing pivotal movement of the blade member relative to the handle assembly.

4. The fixed blade folding knife assembly as recited in claim 3 wherein the lock pin includes a lock detent for receiving the plunger head of the spring pin assembly therein when the lock pin is in the locked position, and the lock pin further including a transition detent for receiving the plunger head of the spring pin assembly therein when the lock pin is in the unlocked position.

5. The fixed blade folding knife assembly as recited in claim 4 wherein the lock pin includes a transition cutout section for disengaging from the pivot pin when the lock pin is moved into the unlocked position.

6. The fixed blade folding knife assembly as recited in claim 5 wherein the handle assembly further comprises:

a right handle slab and a left handle slab fixedly attached to opposite sides of the main body of the central steel member; and each of the right and left handle slabs including an overhang portion and a negative blade grind contour, and the overhang portion being structured and disposed for protectively covering and concealing at least the sharpened cutting edge of the primary blade portion when the blade member is folded into the handle assembly in the closed position, and the negative blade grind contour being cooperatively and congruently configured to match a taper of the blade grind of the primary blade portion to minimize space between the primary blade portion and the left or right handle slab when the blade member is in the closed position, and thereby minimizing the width of the handle assembly when the blade member is in the closed position.

7. The fixed blade folding knife assembly as recited in claim 6 wherein the blade member is structured and disposed to move axially on the pivot pin and outboard of the handle assembly when the blade member is pivotally moved from the open position to the closed position, to thereby position the blade member on the side of one of either the left handle slab or the right handle slab of the handle assembly when the blade member is in the closed position.

* * * * *